(12) United States Patent
Ergen

(10) Patent No.: US 8,954,035 B2
(45) Date of Patent: Feb. 10, 2015

(54) WI-FI AUTHENTICATION BY PROXY

(75) Inventor: Mustafa Ergen, Berkeley, CA (US)

(73) Assignee: Empire Technology Development LLC, Wilmington, DE (US)

( * ) Notice: Subject to any disclaimer, the term of this patent is extended or adjusted under 35 U.S.C. 154(b) by 77 days.

(21) Appl. No.: 13/816,419

(22) PCT Filed: Aug. 3, 2012

(86) PCT No.: PCT/US2012/049528
§ 371 (c)(1),
(2), (4) Date: Feb. 11, 2013

(87) PCT Pub. No.: WO2013/020054
PCT Pub. Date: Feb. 7, 2013

(65) Prior Publication Data
US 2013/0137402 A1     May 30, 2013

Related U.S. Application Data

(60) Provisional application No. 61/574,496, filed on Aug. 4, 2011.

(51) Int. Cl.
*H04M 1/66* (2006.01)
*H04W 12/06* (2009.01)
*G06F 12/06* (2006.01)
*G06F 9/00* (2006.01)
*H04K 1/00* (2006.01)
*H04L 29/06* (2006.01)
*H04W 12/04* (2009.01)
(Continued)

(52) U.S. Cl.
CPC .............. *H04W 12/06* (2013.01); *G06F 12/06* (2013.01); *G06F 9/00* (2013.01); *H04K 1/00* (2013.01); *H04L 63/0876* (2013.01); *H04W 12/04* (2013.01); *H04W 84/12* (2013.01); *H04W 64/00* (2013.01); *H04W 48/18* (2013.01); *H04W 88/06* (2013.01)
USPC ...................... 455/411; 455/412.1; 455/412.2; 455/414.1; 455/418; 455/435.1

(58) Field of Classification Search
CPC ..... H04W 12/04; H04W 12/06; H04W 48/18; H04W 64/00; H04W 84/12; H04W 88/06; H04L 63/0876; H04L 63/0884
USPC ................ 455/411, 412.1, 412.2, 414.1, 418, 455/435.1, 456.2, 461
See application file for complete search history.

(56) References Cited

U.S. PATENT DOCUMENTS 7,734,293 B2    6/2010   Zilliacus et al.
7,835,743 B2   11/2010   Zhang et al.
(Continued)

OTHER PUBLICATIONS

International Search Report & Written Opinion dated Oct. 22, 2012 for PCT/US12/49528.
(Continued)

*Primary Examiner* — Khai M Nguyen
(74) *Attorney, Agent, or Firm* — Brundidge & Stanger, P.C.

(57) ABSTRACT

In one example, a method may include a telecommunication service provider detecting that a cellular device is located within a transmission-receiving distance of an Internet router, determining that the cellular device is associated with a client device, transmitting stored authentication credentials for the client device to the Internet router, and the router registering the client device.

21 Claims, 6 Drawing Sheets

(51) Int. Cl.
*H04W 84/12* (2009.01)
*H04W 64/00* (2009.01)
*H04W 48/18* (2009.01)
*H04W 88/06* (2009.01)

(56) References Cited

U.S. PATENT DOCUMENTS

| | | | |
|---|---|---|---|
| 2003/0153300 A1* | 8/2003 | Nakao | 455/410 |
| 2008/0212535 A1 | 9/2008 | Karaoguz et al. | |
| 2010/0099410 A1 | 4/2010 | Sweeney et al. | |
| 2011/0007705 A1* | 1/2011 | Buddhikot et al. | 370/331 |
| 2011/0105090 A1* | 5/2011 | Shackleton | 455/414.1 |
| 2011/0154447 A1* | 6/2011 | Dennis et al. | 726/4 |
| 2011/0158172 A1 | 6/2011 | Kande et al. | |
| 2012/0039195 A1* | 2/2012 | Jung et al. | 370/252 |
| 2012/0329429 A1* | 12/2012 | Jabara et al. | 455/411 |
| 2013/0231088 A1* | 9/2013 | Jabara et al. | 455/411 |
| 2014/0269662 A1* | 9/2014 | Muhamed et al. | 370/338 |

OTHER PUBLICATIONS

Optimum Online—WiFi—Authentication as printed from internet site <www.optimum.net/WiFi/Authentication/Intro> on Apr. 24, 2012.
Cisco, White Paper, "The Future of Hotspots: Making Wi-Fi as Secure and Easy to Use as Cellular" 2012, pp. 1-9.
Gajraj Singh, International Journal of Research in IT & Management, vol. 2, Issue 2 (Feb. 2012), "A Review on PWLAN in Context of Wi-Fi" (ISSN 2231-4334), pp. 295-316.
Jörg Ott et al., "Towards Automated Authentication for Mobile Users in WLAN Hot-Spots", 2005, 10 pages.

* cited by examiner

WI-FI AUTHENTICATION BY PROXY

RELATED APPLICATION

The present application claims priority to U.S. Provisional Application 61/574,496, entitled "Seamless WiFi Authentication by Cellular Sensing to Any WiFi and WiFi-Only Device," which was filed on Aug. 4, 2011, and which is incorporated herein by reference in its entirety.

TECHNICAL FIELD

The embodiments described herein pertain generally to providing a seamless authentication process for client devices in public Wi-Fi hotspots.

BACKGROUND

Wi-Fi hotspots are becoming ubiquitous, providing Internet access over wireless local area networks, using one or more routers that are connected to a link to an Internet service provider. Wi-Fi hotspots may be found in various public settings, e.g., restaurants, coffee shops, hotel lobbies, etc. A user may thus connect his or her client device to the Internet after the client device has been authenticated to the one or more routers thereat.

SUMMARY

In one example embodiment, a method includes a telecommunication service provider detecting that a cellular device is located within a transmission-receiving distance of an Internet router, determining that the cellular device is associated with a client device, transmitting stored authentication credentials for the client device to the Internet router, and the router registering the client device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
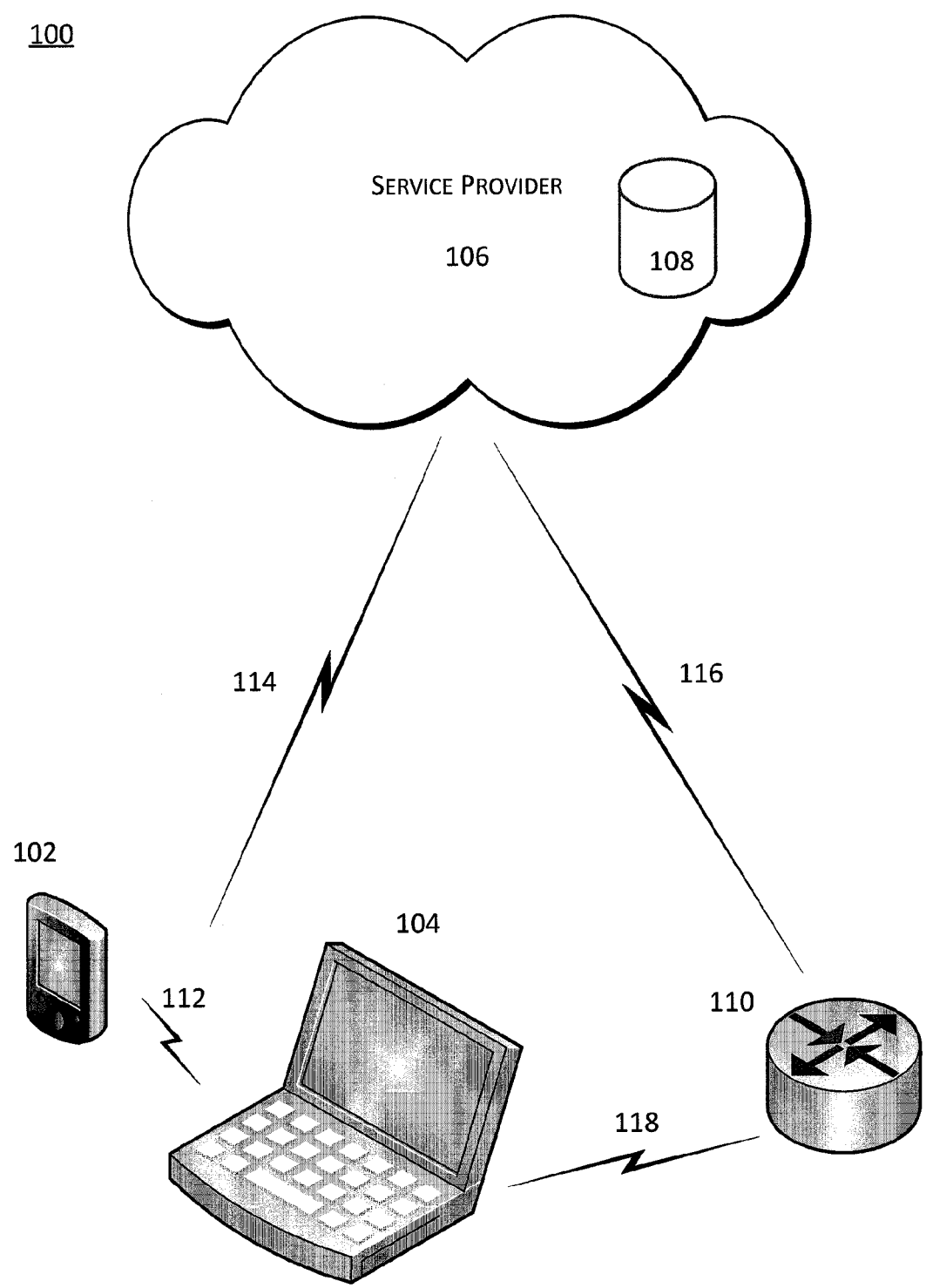
FIG. 1 shows an example system configuration by which Wi-Fi authentication by proxy may be implemented, arranged in accordance with at least some embodiments described herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

FIG. 1 shows an example system configuration by which Wi-Fi authentication by proxy may be implemented, arranged in accordance with at least some embodiments described herein. As depicted, configuration 100 includes, at least, a cellular device 102, a client device 104, a service provider platform 106 having a database 108 associated therewith, and an Internet router 110.

Cellular device 102 may refer to a processor-based electronic device on which an instance of a client application may be hosted to implement at least various aspects of Wi-Fi authentication by proxy. Further, cellular device 102 may be configured to transmit and receive data by connecting to a mobile communications network provided by a wireless telecommunication service provider 106. Cellular device 102 may be implemented as a mobile (or portable) electronic device such as a mobile phone, cell phone, or smartphone. Alternative embodiments may contemplate cellular device implemented as a personal data assistant (PDA), a personal media player device, an application specific device, or a hybrid device that includes any of the above functions.

Client device 104, similar to cellular device 102, may refer to a processor-based electronic device on which an instance of a client application may be hosted to implement at least various aspects of Wi-Fi authentication by proxy. Client device 104 may be configured to transmit and receive data by further connecting to the mobile communications network provided by wireless telecommunication service provider 106. Client device 104 may be implemented as a personal computer including tablet, laptop computer, and non-laptop computer configurations, which may be connected to the aforementioned mobile communications network. Client device 104 may also be implemented as a mobile (or portable) electronic device such as a mobile phone, cell phone, smartphone, personal data assistant (PDA), a personal media player device, an application specific device, or a hybrid device that includes any of the above functions. In this regard, in accordance with at least some embodiments, cellular device 102 may be client device 104, with any distinction being a matter of semantics based upon various capabilities of the device.

Communication link 112 may refer to a standard or protocol that facilitates short-range transmission of data between cellular device 102 and client device 104. Thus, communication link 112 may include communications between cellular device 102 and client device 104 implemented by, e.g., Bluetooth or RF (radio frequency), SMS (short message service), a wired transmission, a radio link, or any standard facilitated by service provider 106.

Thus, in accordance with at least one embodiment of Wi-Fi authentication by proxy, communication link 112 may include a transmission of an identifier, e.g., MAC address corresponding to client device 104, from client device 104 to cellular device 102. A MAC address (media access control address) is a unique identifier assigned to a wireless network interface controller associated with client device 104. Of course, other static and dynamic unique identifiers for client device 104 may be utilized for various embodiments of Wi-Fi authentication by proxy, so long as an association between cellular device 102 and client device 104 may be maintained.

Alternatively, communication link 112 may include a transmission of an identifier, e.g., telephone number or even a MAC address corresponding to cellular device 102, from cellular device 102 to client device 104. Similar to the above, other static and dynamic unique identifiers for cellular device 102 may be utilized for various embodiments of Wi-Fi authentication by proxy, so long as an association between cellular device 102 and client device 104 may be maintained.

Service provider 106 may be regarded as a telecommunication service platform facilitated by an organization or entity that provides, at least, wireless voice and data capabilities to subscribers thereto. Service provider 106 may be implemented as a framework of hardware, software, firmware, or any combination thereof, by which at least voice and data communications may be facilitated. Service provider 106 may facilitate, for a subscriber who owns or exercises control over cellular device 102 and client device 104, cellular data service and Wi-Fi service. Further, cellular data service may refer to telecommunications implemented by standards such as, but not limited to: GSM (global system for mobile communications), CDMA (code division multiple access), GPRS (general packet radio service), 3G, and 4G standards including WiMAX™ (Worldwide Interoperability for Microwave Access), LTE (long term evolution), SMS (short message service), a radio link, etc.

Communication link 114 may refer to a communication link enabled by any standard or protocol facilitated by service provider 106 to transmit voice, data, and/or information between cellular device 102 and service provider 106.

Thus, in accordance with at least one embodiment of Wi-Fi authentication by proxy, communication link 114 may include a transmission to service provider 106 of an association of the identifier, e.g., telephone number or MAC address corresponding to cellular device 102 and the identifier, e.g., MAC address corresponding to client device 104. The transmission may originate from either of cellular device 102 or client device 104, as described herein. In accordance with the scenario in which cellular device 102 is client device 104, the transmission may originate from cellular device 102.

Communication link 116 may refer to a communication link enabled by any standard or protocol facilitated by service provider 106 to transmit voice, data, and/or information between service provider 106 and router 110.

Thus, in accordance with at least one embodiment of Wi-Fi authentication by proxy, communication link 116 may include a transmission of authentication credentials for client device 104, stored in database 108, from service provider 106 to router 110.

Router 110 may refer to a wireless access point that is configured to enable wireless devices, e.g., client device 104, to connect to the Internet using Wi-Fi or other related standards. Such connection may be made automatically, but the embodiments of Wi-Fi authentication by proxy described herein contemplate such connection being made after authentication, i.e., authorization, credentials for client device 104 being submitted to and accepted by router 110.

Wi-Fi may be regarded as any wireless local area network (WLAN) product based on the IEEE 802.11 standards. Wi-Fi authentication by proxy is not limited to such standards, and may be applicable to alternative embodiments by which client device 104 may connect to the Internet via an access point that may be regarded as any "public" network, relative to client device 104, or that is not part of a "home" network, relative to client device 104.

Communication link 118 may refer to a Wi-Fi connection, or a network connection facilitated by another standard or protocol, that is configured to connect client device 104 to the Internet via router 110. Communication link 118 is configured to connect router 110 to the wireless network interface controller associated with client device 104.

Thus, in accordance with at least one embodiment of Wi-Fi authentication by proxy, communication link 118 may include an enabled connection to the Internet for client device 104 via router 110.

By the above, FIG. 1 shows an example implementation of a system configuration for implementing Wi-Fi authentication by proxy.

Figure 2:
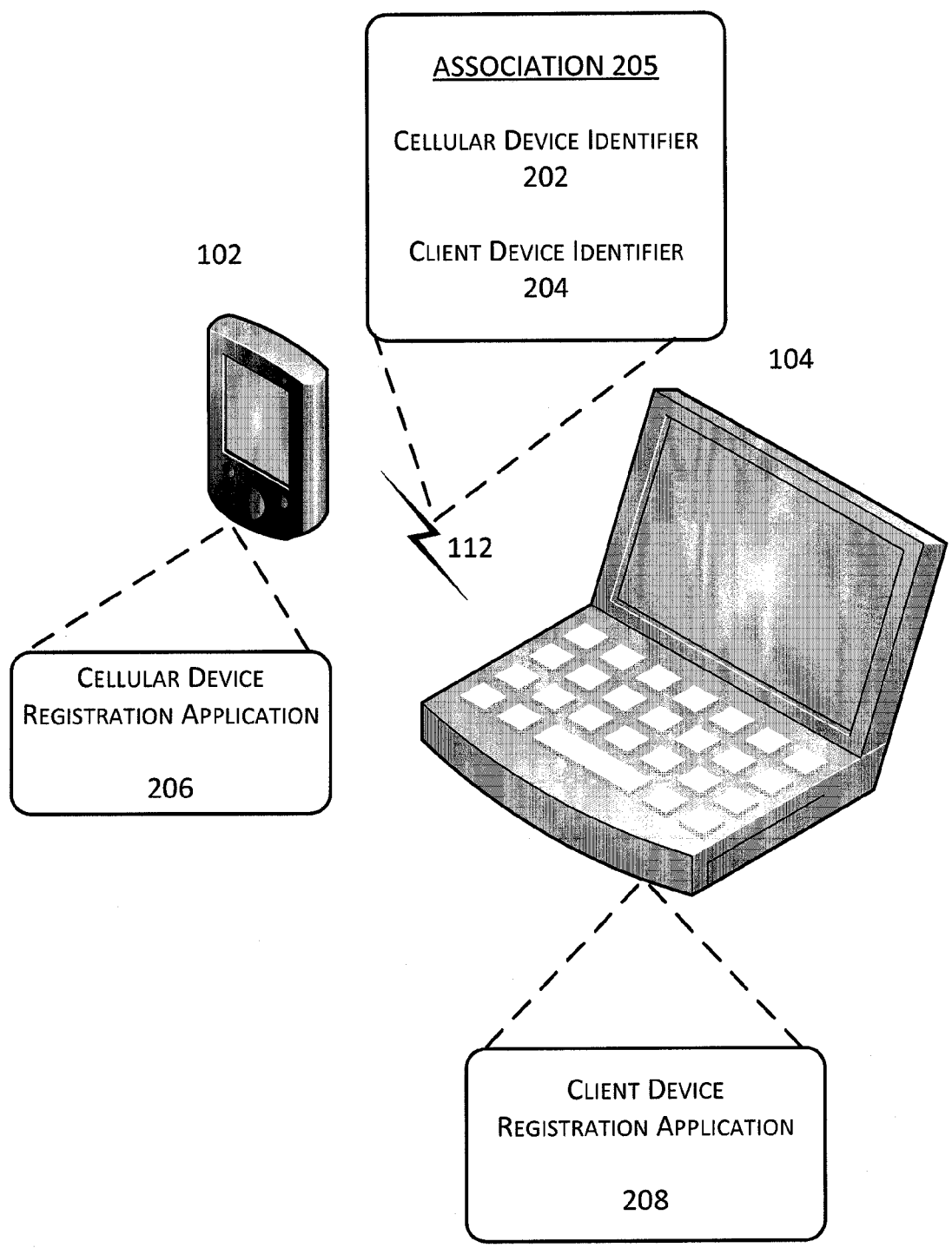
FIG. 2 shows an example configuration of a communication relationship between a cellular device and a client device for implementing Wi-Fi authentication by proxy, arranged in accordance with at least some embodiments described herein.

FIG. 2 shows an example configuration of a communication relationship between cellular device 102 and client device 104 for implementing Wi-Fi authentication by proxy, arranged in accordance with at least some embodiments described herein. As depicted, the example configuration includes cellular device 102, on which an instance of cellular device registration application 206 may be hosted; client device 104, on which an instance of client device registration application 208 may be hosted; and communication link 112.

Cellular device 102, as set forth above, may refer to a processor-based electronic device on which an instance of cellular device registration application 206 may be hosted.

Cellular device registration application 206 may refer to a program configured, designed, and/or programmed to run on an operating system corresponding to cellular device 102. Cellular device registration application 206 may be implemented by hardware, software, firmware, or any combination thereof that may be utilized to associate an identifier 202, e.g., telephone number or MAC address corresponding to cellular device 102 with an identifier 204, e.g., MAC address, corresponding to client device 104. Alternative embodiments of Wi-Fi authentication by proxy may contemplate cellular device registration application 206 being configured, designed, and/or programmed to associate cellular device identifier 202 with multiple instances of identifier 204 corresponding respectively to multiple instances of client device 104. Regardless of the quantity of client devices 104, cellular device registration application 206 may be configured to, via communication link 112, transmit identifier 202 to client device 104 or receive identifier 204 from client device 104. In accordance with the latter, cellular device registration application 206 may be configured to further receive authentication credentials, e.g., passwords, challenge code(s), pictures, etc., from client device 104. Accordingly, cellular device registration application 206 may be further configured to transmit an association 205 of cellular device identifier 202 and client device identifier 204, along with authentication credentials for client device 104, to service provider 106 via communication link 114.

Client device registration application 208 may refer to a program configured, designed, and/or programmed to run on an operating system corresponding to client device 104. Client device registration application 208 may be implemented by hardware, software, firmware, or any combination thereof that may be utilized to associate cellular device identifier 202 and client device identifier 204. Alternative embodiments of Wi-Fi authentication by proxy may contemplate client device registration application 208 being configured, designed, and/or programmed to associate client device identifier 204 with multiple instances of cellular device identifier 202 corresponding respectively to multiple instances of cellular device 102. Regardless of the quantity of cellular devices 102, client device registration application 208 may be configured to, via communication link 112, transmit client device identifier 204 to cellular device 102 or receive cellular device identifier 202 from cellular device 102. In accordance with the latter, client device registration application 208 may be further configured to transmit association 205 of cellular device identifier 202 and client device identifier 204, along with authentication credentials for client device 104, to service provider 106 via communication link 114.

By the above, FIG. 2 shows an example configuration for associating cellular device identifier 202 and client device identifier 204, in accordance with one or more embodiments of Wi-Fi authentication by proxy.

Figure 3:
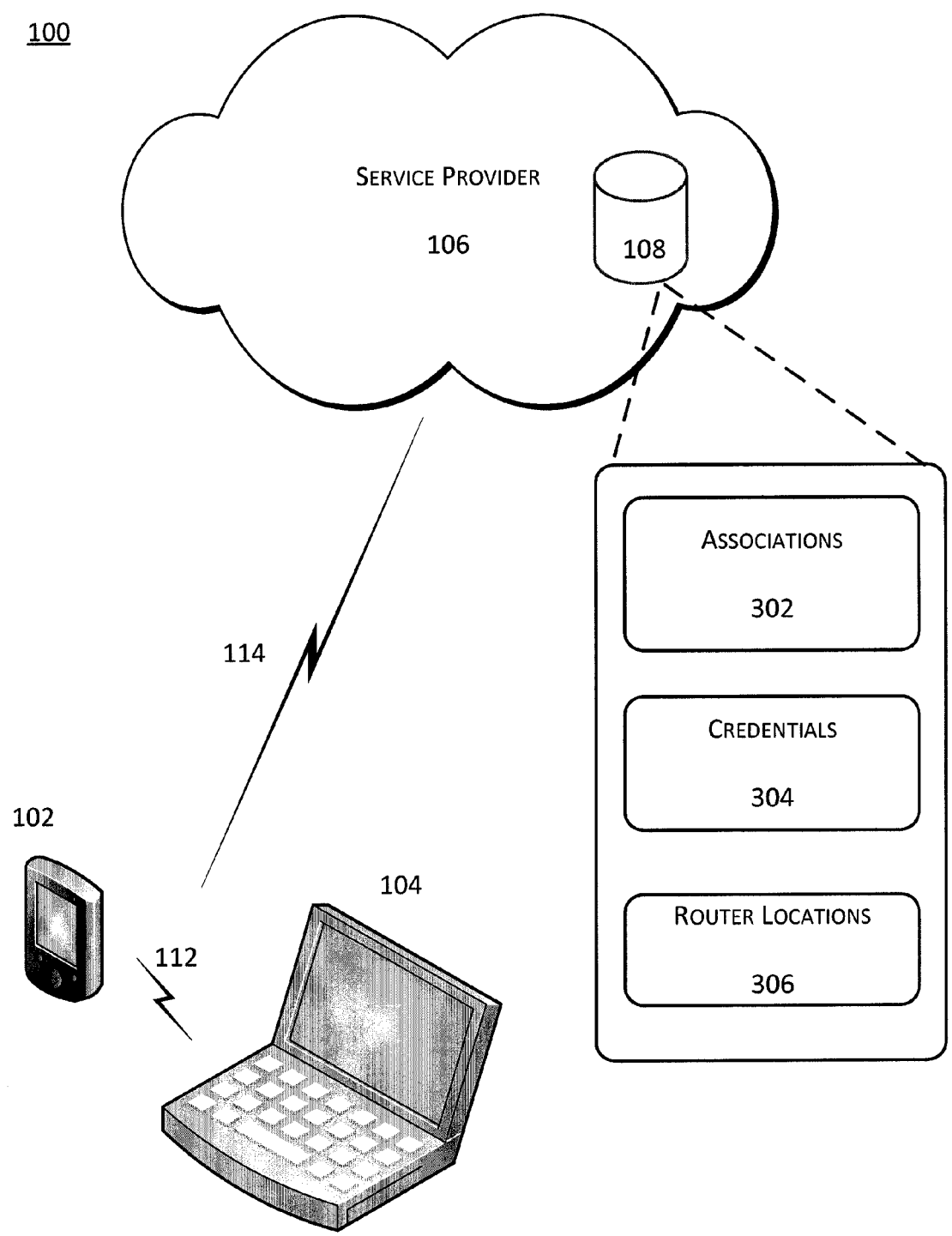
FIG. 3 shows an example of a service provider database, arranged in accordance with at least some embodiments described herein.

FIG. 3 shows an example of a service provider database 108, arranged in accordance with at least some embodiments described herein. As depicted, an example configuration of service provider database 108, hosted on service provider 106, includes an association component 302, a credentials component 304, and a router location component 306. Typically, though not exclusively, the components of service provider database 108 described herein may refer to software components or modules utilized to execute the respective functions. However, the components may further be implemented as hardware and/or firmware. Further still, the functions described for each of the respective components of service provider database 108 may be combined with any of the other components or even removed therefrom, and yet the corresponding functionality may still be executed by the remaining components either singularly or in combination.

Component 302 may refer to a component or module that is configured, designed, and/or programmed to store association 205 received from either of cellular device 102 or client device 104, via communication link 114.

Component 304 may refer to a component or module that is configured, designed, and/or programmed to store authentication credentials for client device 104, whether received from cellular device 102 or client device 104 via communication link 114.

Component 306 may refer to a component or module that is configured, designed, and/or programmed to store locations for router 110, which may further represent the location of any other router corresponding to Wi-Fi hotspots associated with service provider 106. The locations for router 110 or any other router associated with service provider 106 may be in the form of GPS coordinates, IP addresses, etc.

By the above, FIG. 3 shows an example configuration of service provider database 108 by which Wi-Fi authentication by proxy may be implemented.

Figure 4:
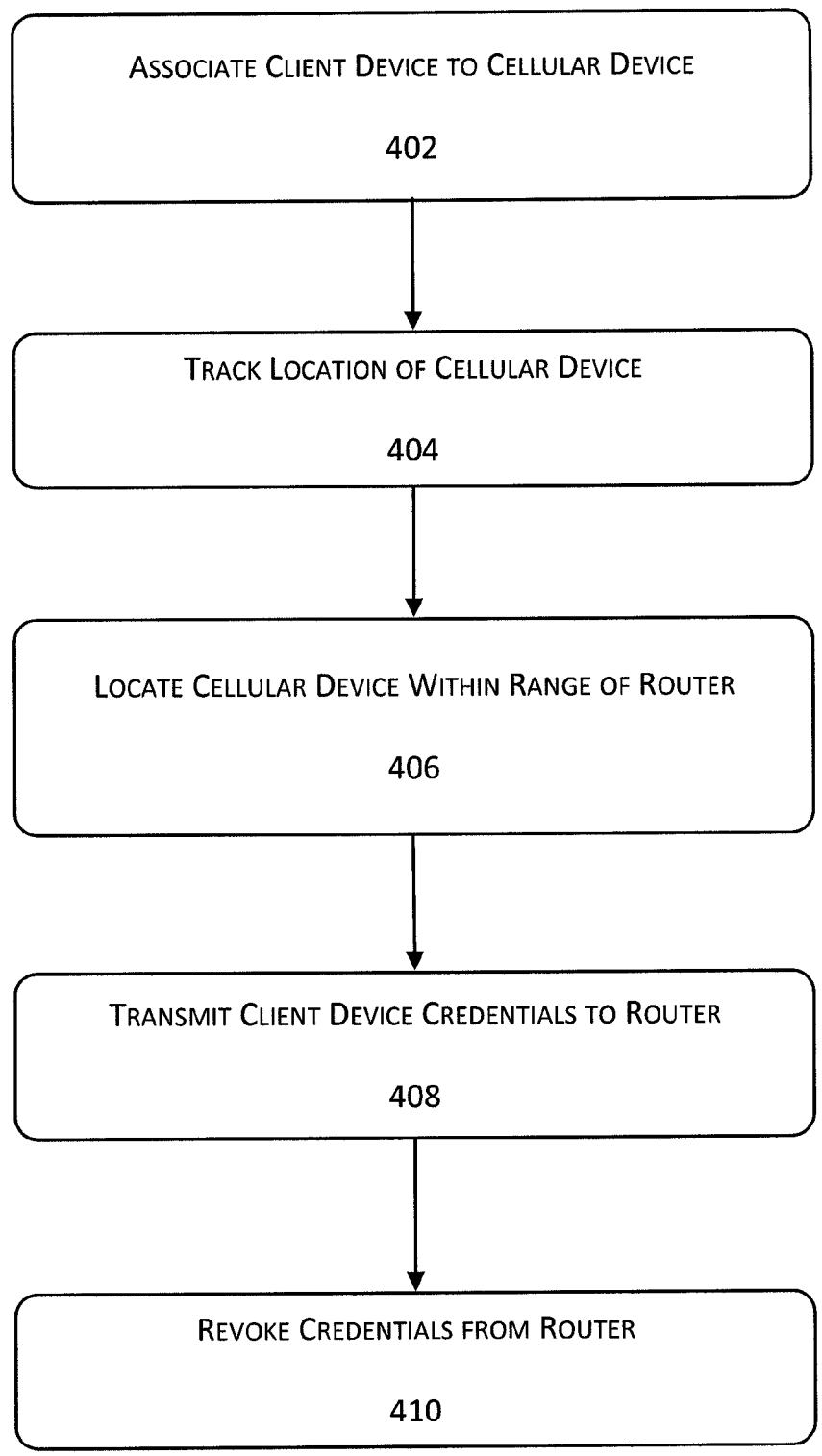
FIG. 4 shows an processing flow of operations for Wi-Fi authentication by proxy, in accordance with at least some embodiments described herein.

FIG. 4 shows an processing flow of operations for Wi-Fi authentication by proxy, in accordance with at least some embodiments described herein. As depicted, processing flow 400 includes sub-processes executed by various components that are part of the telecommunication service platform facilitated by service provider 106. However, processing flow 400 is not limited to such components, as obvious modifications may be made by re-ordering two or more of the sub-processes described here, eliminating at least one of the sub-processes, adding further sub-processes, substituting components, or even having various components assuming sub-processing roles accorded to other components in the following description. Processing flow 400 may include various operations, functions, or actions as illustrated by one or more of blocks 402, 404, 406, 408 and/or 410. Processing may begin at block 402.

Block 402 (Associate Client Device to Cellular Device) may refer to cellular device registration application 206 associating cellular device identifier 202 with client device identifier 204. Thus, block 402 may refer to cellular device registration application 206 transmitting cellular device identifier 202 to client device 104, or receiving client device identifier 204 from client device 104. In accordance with the latter, block 402 may further refer to cellular device registration application 206 receiving authentication credentials, e.g., passwords, challenge code(s), pictures, etc., from client device 104. Accordingly, block 402 may still further refer to cellular device registration application 206 transmitting association 205 of cellular device identifier 202 and client device identifier 204, along with authentication credentials for client device 104, to service provider 106 via communication link 114.

Block 402 may alternatively refer to client device registration application 208 associating cellular device identifier 202 and client device identifier 204. Thus, block 402 may refer to client device registration application 208 transmitting client device identifier 204, and corresponding authentication credentials, to cellular device 102, or receiving cellular device identifier 202 from cellular device 102. In accordance with the latter, block 402 may further refer to client device registration application 208 transmitting association 205 of cellular device identifier 202 and client device identifier 204, along with authentication credentials for client device 104, to service provider 106 via communication link 114. Processing flow 400 may proceed from block 402 to block 404.

Block 404 (Track Location of Cellular Device) may refer to service provider 106 tracking a current location of cellular device 102. The tracking of cellular device 102 may be implemented by service provider 106 periodically transmitting a pinging signal to cellular device 102. A pinging signal, i.e., packet Internet groper, may refer to a utility for determining whether a communication signal or IP address corresponding to cellular device 102 is reachable by sending out a packet and waiting for a response. Thus, block 404 may further include service provider 106 receiving a response from cellular device 102 in response to one of the periodic pinging signals, and service provider 106 recording and/or storing a location from which the response to the pinging signal is transmitted. Alternatively, the tracking of cellular device 102 may be implemented by service provider 102 receiving and/or storing a GPS location signal that is periodically transmitted from cellular device 102. The GPS location signal may be transmitted from a GPS transmitter associated with cellular device 102, which is ubiquitous with cellular devices. Regardless of the implementation, service provider 106 is configured, designed, and or programmed to track a current location of cellular device 102, in accordance with a frequency of received responses to the periodic pinging signals and/or received GPS location signals. Processing flow 400 may proceed from block 404 to block 406.

Block 406 (Locate Cellular Device Within Range of Router) may refer to service provider 106 determining that the current location of cellular device 102 is within transmitting range of router 110. The location of router 110, which may further represent the location of any other router corresponding to Wi-Fi hotspots associated with service provider 106, may be stored at and retrievable from component 306. Thus, as service provider 106 determines a current location of cellular device 102, service provider 106 may further compare the current location of cellular device 102 to the location of router 110. With an inherent knowledge of a transmitting range of router 110, service provider 106 may determine that cellular device 102 is within the transmitting range of router 110. Processing flow 400 may proceed from block 406 to block 408.

Block 408 (Transmit Client Device Credentials to Router) may refer to service provider 106 transmitting the authentication credentials for client device 104 to router 110 via communication link 116. That is, having determined that cellular device 102 is within transmitting range of router 110 and further based on the intention to reduce or eliminate a time-consuming authentication process for a user of client device 104, service provider may provide a seamless authentication process by leveraging association 205 between cellular device 102 and client device 104 by transmitting the authentication credentials corresponding to client device 104, stored at and retrievable from component 304, to router 110. Accordingly, client device 104 may be authenticated to router 110 and able to access the Internet, via router 110, automatically. Processing flow 400 may proceed from block 408 to block 410.

Block 410 (Revoke Credentials from Router) may refer to service provider 106 revoking the authorization credentials corresponding to client device 104 from router 110 when service provider 106 determines that cellular device 102 is no longer within transmitting range of router 110. That is, service provider 106 may continue to track a current location of cellular device 102, even when client device 104 is authenticated to router 110. For security purposes, when service provider 106 determines that cellular device 102 has moved beyond the transmitting range of router 110, service provider may revoke the authentication credentials corresponding to client device 104 from router 110 via communication link 106.

Thus, FIG. 4 shows an example processing flow for implementing Wi-Fi authentication by proxy, executed by the devices and components described with reference to FIGS. 1-3.

Figure 5:
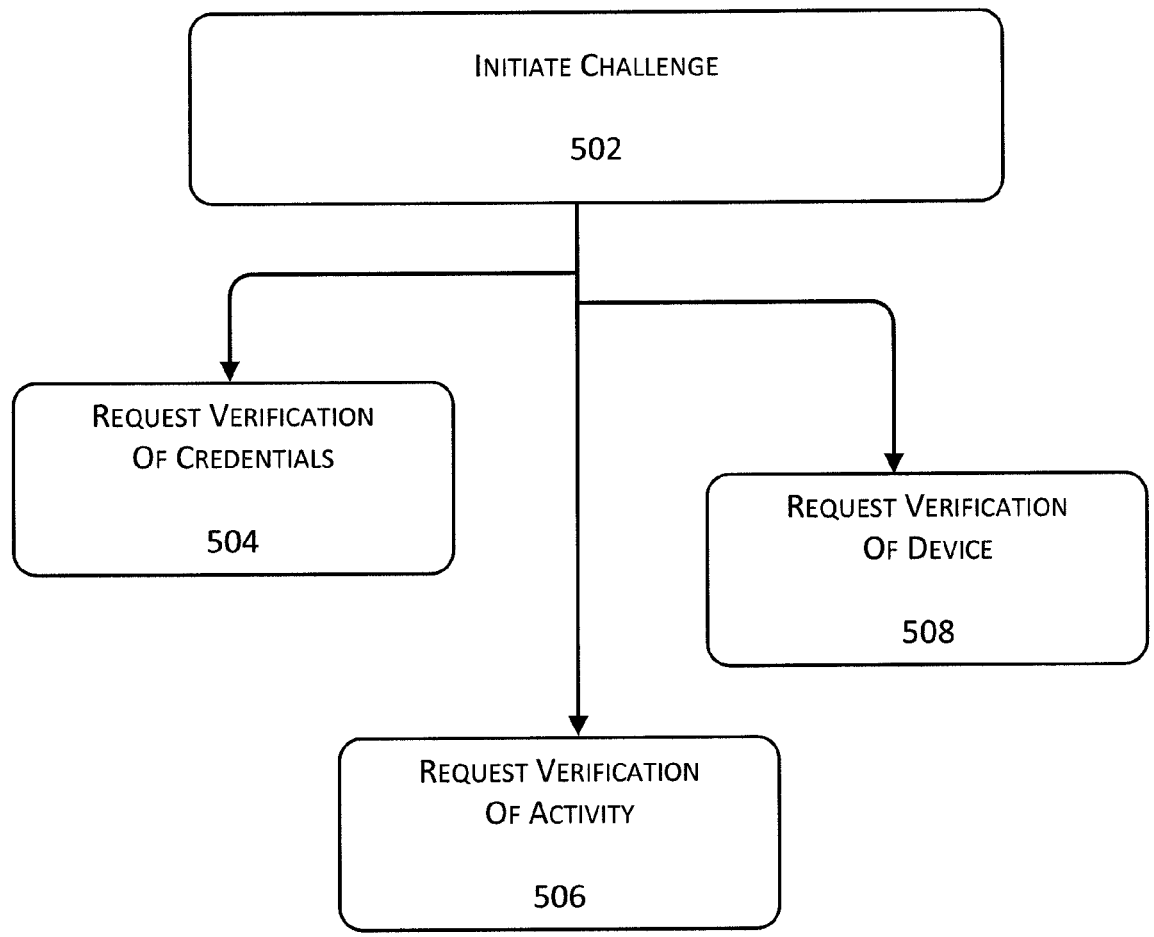
FIG. 5 shows a processing flow of operations for authentication of a client device, in accordance with at least some embodiments described herein.

FIG. 5 shows a processing flow of operations for authentication of a client device, in accordance with at least some embodiments described herein. More particularly, service provider 106 may implement a challenge operation as an added layer of security for authenticating one or more instances of client device 104, under at least the control of a user of cellular device 102, for a connection to router 110.

As depicted, processing flow 500 includes sub-processes executed by various components that are part of the telecommunication service platform facilitated by service provider 106 and at least one of cellular device 102 and client device 104. However, processing flow 500 is not limited to such components, as obvious modifications may be made by re-ordering two or more of the sub-processes described here, eliminating at least one of the sub-processes, adding further sub-processes, substituting components, or even having various components assuming sub-processing roles accorded to other components in the following description. Processing flow 500 may include various operations, functions, or actions as illustrated by one or more of blocks 502, 504, 506, and/or 508. Processing may begin at block 502.

Block 502 (Initiate Challenge) may refer to service provider 106 initiating a challenge to verify the authentication credentials for a one or more instances of client device 104 that have been authenticated for a connection to router 110. Processing flow 500 may proceed from block 502 to any one, or more, of blocks 504, 506, and 508.

Block 504 (Request Verification of Credentials) may refer to service provider 106, via communication links 116 and 118, directing a browser running on an operating system of client device 104 to display a request for verification of the credentials corresponding to client device 104 that are stored in database 108. The requested verification may be, e.g., a re-entry of a password, visual verification of a picture using a webcam associated with client device 104, an answer to a security question, etc. A matching or otherwise appropriate answer to the challenge may result in a continued connection between client device 104 and router 110, whereas a mismatched or otherwise inappropriate answer may result in service provider 106 revoking the credentials for client device from router 110.

Block 506 (Request Verification of Activity) may refer to service provider 106, via communication links 116 and 118, directing a browser running on an operating system of client device 104 to display a listing of recent Internet activity corresponding to association 205. Alternatively, service provider 106 may transmit the listing of recent Internet activity corresponding to association 205 to cellular device 102 via communication link 114. Regardless of the recipient, the listing of recent Internet activity corresponding to association 205 may include a request for verification. A positive verification may result in a continued connection between client device and router 110, whereas a denial of the recent Internet activity may result in service provider 106 revoking the credentials for client device from router 110.

Block 508 (Request of Verification of Device) may refer to service provider 106, via communication link 114, transmitting a request for verification that client device 104 is, indeed, intended to be connected to router 110. The request may be transmitted in the form of, e.g., an SMS, an email, a web page, etc. Regardless of the form of the transmission, a positive verification may result in a continued connection between client device and router 110, whereas a denial may result in service provider 106 revoking the credentials for client device from router 110.

Accordingly, FIG. 5 shows a further level of security implemented for Wi-Fi authentication by proxy.

Figure 6:
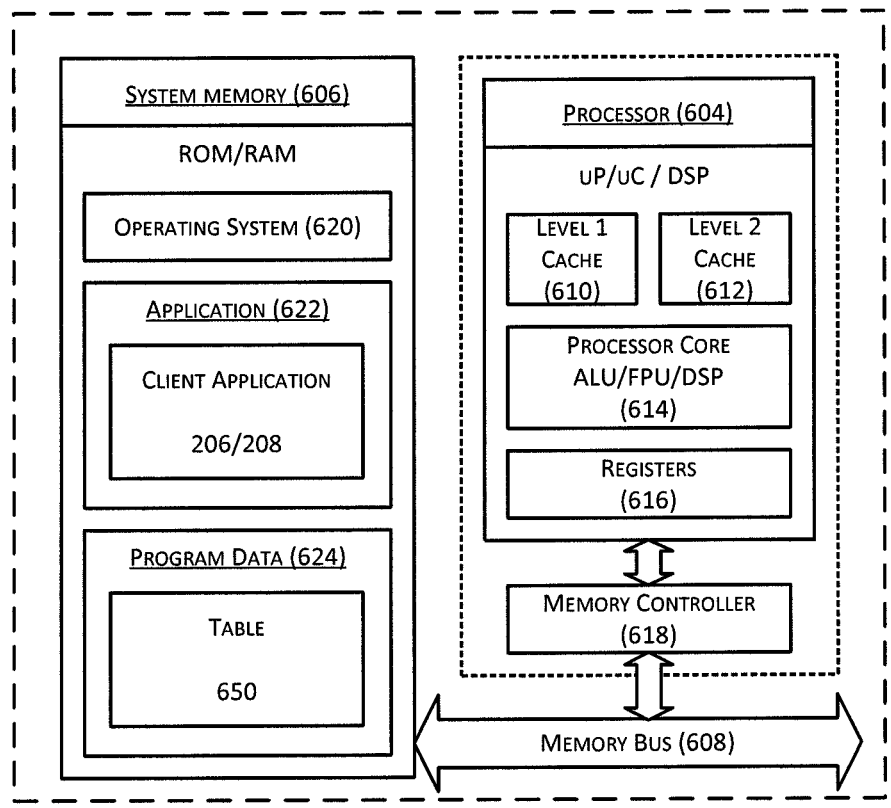
FIG. 6 shows a block diagram illustrating an example computing device by which various example solutions described herein may be implemented, arranged in accordance with at least some embodiments described herein.

FIG. 6 shows a block diagram illustrating an example computing device 600 by which various example solutions described herein may be implemented, arranged in accordance with at least some embodiments described herein.

More particularly, FIG. 6 shows an illustrative computing embodiment, in which any of the processes and sub-processes described herein may be implemented as computer-readable instructions stored on a non-transitory computer-readable medium. The computer-readable instructions may, for example, be executed by a processor of a device, as referenced herein, having a network element and/or any other device corresponding thereto, particularly as applicable to the applications and/or programs described above corresponding to the configuration 100 for Wi-Fi authentication by proxy.

In a very basic configuration, a computing device 600 may typically include one or more processors 604 and a system memory 606. A memory bus 608 may be used for communicating between processor 604 and system memory 606.

Depending on the desired configuration, processor 604 may be of any type including but not limited to a microprocessor (μP), a microcontroller (μC), a digital signal processor (DSP), or any combination thereof.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624.

Application 622, which may correspond to one or both of applications 206 and 208, may be configured to transmit or receive identification information pertaining to cellular device 102 or client device 104 to verify or validate such identifying data, and transmit device data as described previously with respect to FIGS. 1-5. Program data 624 may include a table 650, which may be useful for implementing actuation of appropriate components or modules as described herein.

System memory 606 is an example of computer storage media. Computer storage media may include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein may be implemented, e.g., hardware, software, and/or firmware, and that the preferred vehicle may vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes for system configuration 100 via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, e.g., as one or more programs running on one or more computer systems, as one or more programs running on one or more processors, e.g., as one or more programs running on one or more microprocessors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors, e.g., feedback for sensing position and/or velocity; control motors for moving and/or adjusting components and/or quantities. A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Lastly, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

I claim:

1. A method, comprising:
a telecommunication service provider detecting that a cellular device is located within a transmission-receiving distance of an Internet router;
the telecommunication service provider determining that the cellular device is associated with a client device; and
based on the detecting, the telecommunication service provider transmitting, to the Internet router, authentication credentials corresponding to the client device to authenticate the client device to the Internet router.

2. The method of claim 1, further comprising the Internet router registering the client device.

3. The method of claim 1, wherein the association of the client device and the cellular device is registered with the telecommunication service provider by the client device utilizing any one of an Internet-based application, an SMS application, or a call center.

4. The method of claim 3, wherein a MAC address corresponding to the client device is associated with a telephone number corresponding to the cellular device.

5. A system, comprising:
a cellular device configured to transmit a current location thereof;
a client device configured to associate an identifier thereof with an identifier of the cellular device; and
a telecommunication service provider configured to:
store, in a database, the association of the identifier of the client device with the identifier of the cellular device and log-in credentials corresponding to the client device,
determine that the current location of the cellular device is within transmitting range of a registered Internet router, and
based on the determining, transmit, to the registered Internet router, the log-in credentials corresponding to the client device to authenticate the client device to the registered Internet router.

6. The system of claim 5, wherein the identifier of the cellular device includes a telephone number.

7. The system of claim 5, wherein the identifier of the client device includes a MAC address.

8. The system of claim 5, wherein the cellular device is the client device.

9. The system of claim 5, wherein the association of the identifier of the client device with the identifier of the cellular device and the log-in credentials corresponding to the client device are transmitted to the telecommunication service provider via a client device application.

10. The system of claim 5, wherein the association of the identifier of the client device with the identifier of the cellular device and the log-in credentials corresponding to the client device are transmitted to the telecommunication service provider via an SMS application.

11. The system of claim 5, wherein the association of the identifier of the client device with the identifier of the cellular device and the log-in credentials corresponding to the client device are transmitted to the telecommunication service provider via a cellular device application.

12. The system of claim 5, wherein the association of the identifier of the client device with the identifier of the cellular device and the log-in credentials corresponding to the client device are transmitted to the telecommunication service provider via a call center.

13. The system of claim 5, wherein the cellular device is configured to transmit the current location thereof by periodically transmitting a GPS locating signal.

14. The system of claim 5, wherein the cellular device is configured to transmit the current location thereof by transmitting a response to a ping periodically received from the telecommunication service provider.

15. The system of claim 5, wherein the router is further configured to revoke the log-in credentials corresponding to the client device when the current location of the cellular device is no longer within transmitting range of the registered Internet router.

16. A non-transitory computer-readable medium storing instructions that, when executed, cause one or more processors to perform operations comprising:
 determining that a cellular device is associated with a client Internet device;
 detecting that the cellular device is located within a transmission-receiving distance of a Wi-Fi hotspot;
 based on the operation of detecting, transmitting, to the Wi-Fi hotspot, authenticating credentials corresponding to the client Internet device to authenticate the client Internet device to the Wi-Fi hotspot.

17. The non-transitory computer-readable medium of claim 16, wherein the operation of determining includes:
 associating an identifier corresponding to the cellular device with an identifier corresponding to the client device.

18. The non-transitory computer-readable medium of claim 16, wherein the identifier corresponding to the cellular device is a telephone number.

19. The non-transitory computer-readable medium of claim 16, wherein the identifier corresponding to the client device is a MAC address.

20. The non-transitory computer-readable medium of claim 16, wherein the operation of detecting includes:
 tracking global positioning system (GPS) signals transmitted from the cellular device to determine a current location of the cellular device; and
 comparing the determined current location of the cellular device to a listing of registered Wi-Fi hotspots.

21. The non-transitory computer-readable medium of claim 16, wherein the operation of detecting includes:
 transmitting periodic pinging signals to the cellular device to determine a current location of the cellular device; and
 comparing the determined current location of the cellular device to a listing of registered Wi-Fi hotspots.

* * * * *